US009671004B2

(12) United States Patent
Rambaud

(10) Patent No.: US 9,671,004 B2
(45) Date of Patent: Jun. 6, 2017

(54) DIFFERENTIAL DEVICE FOR A MOTORISED WHEELED VEHICLE

(71) Applicant: FRANCE REDUCTEURS, Les Herbiers (FR)

(72) Inventor: Jacques Rambaud, Les Epesses (FR)

(73) Assignee: FRANCE REDUCTEURS, Les Herbiers (FR)

( * ) Notice: Subject to any disclaimer, the term of this patent is extended or adjusted under 35 U.S.C. 154(b) by 229 days.

(21) Appl. No.: 14/436,269

(22) PCT Filed: Sep. 23, 2013

(86) PCT No.: PCT/FR2013/052212
§ 371 (c)(1),
(2) Date: Apr. 16, 2015

(87) PCT Pub. No.: WO2014/060667
PCT Pub. Date: Apr. 24, 2014

(65) Prior Publication Data
US 2015/0276035 A1 Oct. 1, 2015

(30) Foreign Application Priority Data

Oct. 18, 2012 (FR) ...................................... 12 59929

(51) Int. Cl.
*F16H 48/12* (2012.01)
*F16H 48/19* (2012.01)
(52) U.S. Cl.
CPC ........ *F16H 48/19* (2013.01); *Y10T 74/19005* (2015.01)

(58) Field of Classification Search
CPC .... F16H 48/19; F16H 48/20; F16H 2048/202; A01B 12/006; Y10T 74/19005
See application file for complete search history.

(56) References Cited

U.S. PATENT DOCUMENTS 2,315,299 A 3/1943 Thornton
2,329,075 A 9/1943 Myers
(Continued)

FOREIGN PATENT DOCUMENTS

GB 2 130 315 A 5/1984

OTHER PUBLICATIONS

International Search Report, dated Dec. 20, 2013, from corresponding PCT application.

*Primary Examiner* — David M Fenstermacher
(74) *Attorney, Agent, or Firm* — IPSilon USA, LLP

(57) ABSTRACT

A differential device (1) for a self-propelled wheeled vehicle, includes an input ring gear (2), two shafts separate from each other, two clutch mechanisms each including a first clutch member (3) mounted integral in rotation to one of the shafts, and a second clutch member (4) mounted freely rotatable relative to the shaft and capable of being rotated by the ring gear (2), the second clutch member being capable of being moved axially. Each second clutch member is provided with elements (44) for bearing contact with the other second clutch member, the elements for bearing contact being capable, in a first given angular configuration of the second clutch members relative to each other, of keeping the second clutch members in the engaged position, and the elements for bearing contact also being capable, in a second given angular configuration, of allowing the second clutch members to shift to the disengaged position.

16 Claims, 4 Drawing Sheets

(56) References Cited

U.S. PATENT DOCUMENTS

| | | | | |
|---|---|---|---|---|
| 2,545,601 | A * | 3/1951 | Brubaker | F16H 48/08 475/231 |
| 2,855,806 | A * | 10/1958 | Fallon | F16H 48/08 475/234 |
| 3,131,578 | A * | 5/1964 | Elliott | F16H 48/08 475/231 |
| 3,397,593 | A * | 8/1968 | Knoblock | F16H 48/142 74/650 |
| 4,104,931 | A * | 8/1978 | Tomich | F16H 48/142 74/650 |
| 5,637,049 | A * | 6/1997 | Zentmyer | B60K 17/20 192/49 |
| 6,062,105 | A | 5/2000 | Tyson et al. | |
| 8,858,385 | B2 * | 10/2014 | Forrest | F16H 48/24 475/231 |
| 9,151,376 | B2 * | 10/2015 | Creager | F16H 48/19 |
| 9,303,748 | B2 * | 4/2016 | Creager | F16H 48/19 |
| 9,309,957 | B2 * | 4/2016 | Creager | F16H 48/19 |
| 9,334,941 | B2 * | 5/2016 | Creager | F16H 48/22 |
| 9,453,569 | B2 * | 9/2016 | Cochren | F16H 48/08 |

\* cited by examiner

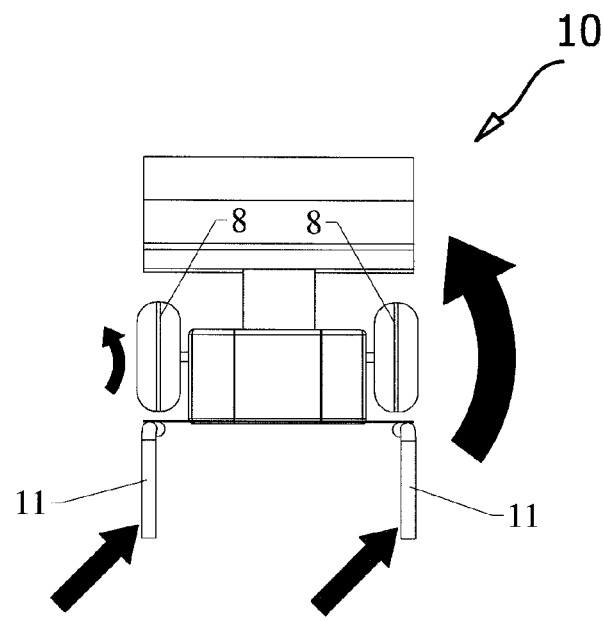
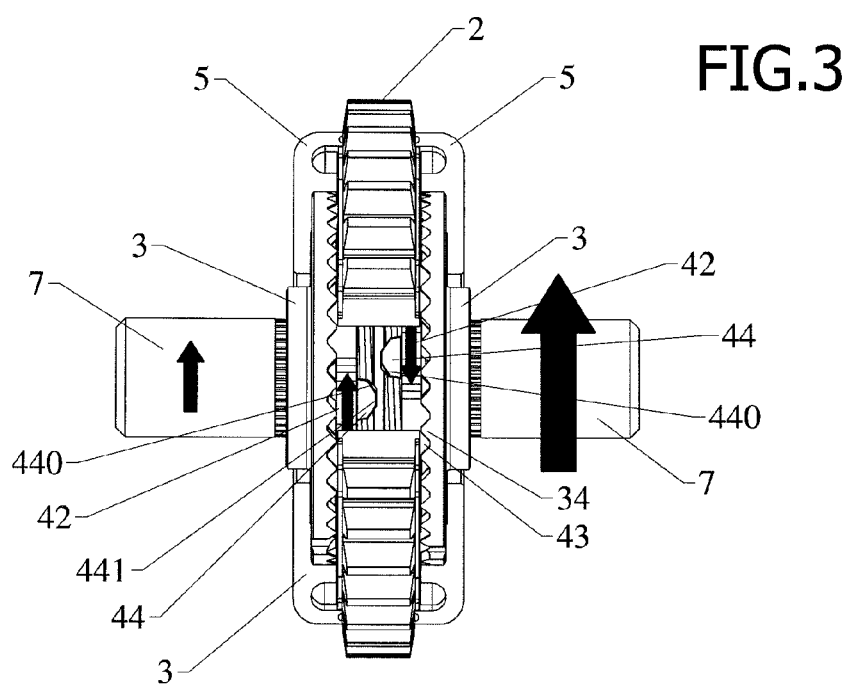
FIG.3
FIG.3A

DIFFERENTIAL DEVICE FOR A MOTORISED WHEELED VEHICLE

The present invention generally relates to differential devices.

The invention more particularly relates to a differential device for an automotive wheeled vehicle. Said device comprises an input ring gear capable of being rotated by the motor of said vehicle, two wheel shafts separate from one another and allocated to either side of the ring gear coaxially to said ring gear. Said device also comprises two clutch mechanisms each comprising a first clutch element mounted in a rotationally fixed manner with one of said wheel shafts and a second clutch element mounted in a freely rotatable manner relative to said shaft and capable of being rotated by the ring gear. Said second clutch elements are positioned between said first clutch elements. For each clutch mechanism, said second clutch element is capable of being axially displaced between a close position of said first clutch element in which it is engaged with the first clutch element and a position spaced apart from said first clutch element in which it is disengaged from the first clutch element. Said ring gear and the second clutch elements are provided with co-rotational coupling means.

The invention likewise relates to an automotive wheeled vehicle, such as a snowplow, equipped with a differential device of this kind.

A differential device such as that described above interposed between the wheel shafts and the motor of an automotive wheeled vehicle is known from the state of the art and, in particular, from document GB2130315. A differential device of this kind known from the state of the art allows the outside wheel of the vehicle to be disconnected while making a turn, so that it is able to turn more quickly than the inside wheel and thereby prevent the vehicle from sliding.

However, with differential devices of this kind known in the state of the art, the inside wheel remains engaged with the vehicle motor, such that the vehicle's turning radius is still considerable, which prevents sharp turns from being taken and, in particular, prevents the vehicle from being made to pivot on itself.

In particular, in the event that the vehicle is a snowplow, it is desirable to be able to move the snowplow following the tightest possible snaking path, in order to prevent strips of snow from escaping the clearing action. A tight snaking path of this kind requires the vehicle to be able to be pivoted on itself by the driver with the help of the vehicle's handlebar when it reaches the end of a straight section of the snake, in order to clear the snow from the following section of the snaking path.

The object of the present invention is to propose a differential device and a corresponding automotive wheeled vehicle allowing the turning radius of the automotive wheeled vehicle equipped with a device of this kind to be reduced easily and automatically, so that it can take a very tight turn.

To this end, the object of the invention is a differential device for an automotive wheeled vehicle, said device comprising:

an input ring gear capable of being rotated by the motor of said vehicle, two wheel shafts separate from one another and allocated to either side of the ring gear coaxially to said ring gear, two clutch mechanisms each comprising a first clutch element mounted in a rotationally fixed manner with one of said wheel shafts and a second clutch element mounted in a freely rotatable manner relative to said shaft and capable of being rotated by the ring gear, said second clutch elements being positioned between said first clutch elements, for each clutch mechanism, said second clutch element being capable of being displaced axially between a close position of said first clutch element in which it is engaged with the first clutch element and a spaced apart position of said first clutch element in which it is disengaged from the first clutch element, said ring gear and the second clutch elements being provided with co-rotational coupling means, characterized in that every second clutch element is also provided with supporting contact means with the other second clutch element, said supporting contact means being capable, in a first given angular configuration of the second clutch elements relative to one another, of keeping the second clutch elements in the engaged position with the first corresponding clutch elements, and said supporting contact means also being capable, in a second given angular configuration of the second clutch elements relative to one another, unlike in the first configuration, of allowing the second clutch elements to shift into the disengaged position in relation to the first clutch elements.

Hence, when a difference in speed between the vehicle wheels when making a turn means that the second clutch elements are offset angularly in respect of one another, it is possible for said second clutch elements to be displaced in relation to one another axially moving closer together. The moving closer of said second clutch elements in respect of one another then leads to the disengagement of the corresponding vehicle wheels.

Hence, when taking a very tight bend when the outside wheel tends to turn quicker than the input ring gear and when the inside wheel turns in the opposite direction to the input ring gear, the second clutch elements are offset angularly relative to one another until they each come into abutment against opposing stops formed by coupling means of the input ring gear with the second clutch elements. The first and second clutch elements of each mechanism are limited to different rotational speeds and they then have a tendency to move apart, which allows the angular offset of the second clutch elements which releases the axial mobility to move together of said second clutch elements of the two mechanisms one in relation to the other.

Conversely, when the vehicle returns to a straight path, its wheels turn in the same direction at a speed which allows them to be driven by the ring gear. In fact, the second clutch elements return in the first angular configuration in which they are engaged with the ring gear and keep one another axially against the first clutch elements, such that the wheels are again driven by the ring gear.

A design of this kind of the second clutch elements allows them to interact against one another depending on their respective rotational speeds and relative to the ring gear, which enables the vehicle's wheels to be kept engaged with the motor in a straight line, in order to benefit from the vehicle's automotive function while at the same time allowing the two wheels to disengage automatically when they are making a tight turn on themselves, in other words when the turn is made about an axis of rotation perpendicular to the ground and situated between the vehicle's two wheels. Simultaneous disengagement of the wheels is made possible by the angular offsetting of the second clutch elements of the two mechanisms in relation to one another, which allows them to be displaced axially towards one another and thereby avoid the first clutch elements which rotate in a fixed manner with the corresponding vehicle wheels.

Hence, the invention allows the driver, who may be walking behind the vehicle, for example, to make a very tight turn with automatic disengagement of the vehicle wheels during the course of said turn.

According to an advantageous characteristic of the invention, said second clutch elements are configured to exhibit said first angular configuration when said shafts turn at the same speed and, in said first angular configuration, said supporting contact means of the second clutch elements are axially opposed by supporting contact.

According to an advantageous characteristic of the invention, said second clutch elements are configured to exhibit said second angular configuration when said shafts turn at different speeds in relation to one another and in said second annular configuration, said supporting contact means of one of the second clutch elements are offset angularly in relation to the supporting contact means of the other second clutch element.

According to an advantageous characteristic of the invention, said device comprises restoring means of the second clutch elements towards the first corresponding clutch elements.

According to an advantageous embodiment of the invention, said supporting contact means of every second clutch element comprise teeth oriented towards the other second clutch element which, in said first angular configuration, are in supporting contact with the teeth of the other second clutch element by their tips, preventing an axial displacement of the second clutch elements towards one another and which, in the second angular configuration, are offset angularly in relation to the other teeth, allowing an axial displacement of the second clutch elements towards one another.

According to an advantageous characteristic of the invention, each of said teeth comprises two inclined facing sides forming ramps which converge in the direction of the flat tip of the tooth.

According to an advantageous characteristic of the invention, the coupling means between the ring gear and the second clutch elements comprise so-called internal teeth made on the inner circumference of the ring gear and so-called external teeth made on the outer circumference of each of the second clutch elements housed between the internal teeth of the ring gear.

The space between two successive internal teeth of the ring gear is greater than the overall dimensions of an external tooth of a second clutch element. In particular, the space between two successive internal teeth of the ring gear is capable of housing an external tooth of a second clutch element and an external tooth of the other second clutch element, whether they are in the first or second angular configuration. In other words, the teeth of each pair of internal teeth of the ring gear are spaced at a distance allowing an external tooth of one of the second clutch elements and an external tooth of the other second clutch element to be housed.

Said space between two internal teeth of the ring gear is also chosen such that when the clutch mechanism is in a disengaged configuration, the supporting contact means of one of the second clutch elements which are offset angularly in relation to the supporting contact means of the other second clutch element cannot return in axial opposition on other supporting contact means of said other second clutch element. In other words, when the clutch mechanisms are in a disengaged configuration, the internal teeth of the ring gear limit the relative rotation of the second clutch elements to prevent untimely reengaging.

According to an advantageous characteristic of the invention, the first clutch elements, the second clutch elements and the input ring gear are sandwiched between two flanges fixed one to the other and the wheel shafts pass through them.

The invention likewise relates to an automotive wheeled vehicle comprising a differential device such as that described above and two side wheels, one being fixed to one of said wheel shafts and the other to the other wheel shaft, said wheeled vehicle also comprising a motor and torque transfer means interposed between said motor and the input ring gear.

The invention will be properly understood by reading the following description of exemplary embodiments with reference to the attached drawings in which:

FIG. 3 is a schematic view from above of an automotive wheeled snowplow with the driver walking which is equipped with a device according to the invention, in the process of making a turn;

FIG. 3A is a front view of the device illustrated in FIG. 2 for a configuration for making a turn as illustrated in FIG. 3;

Figure 1:
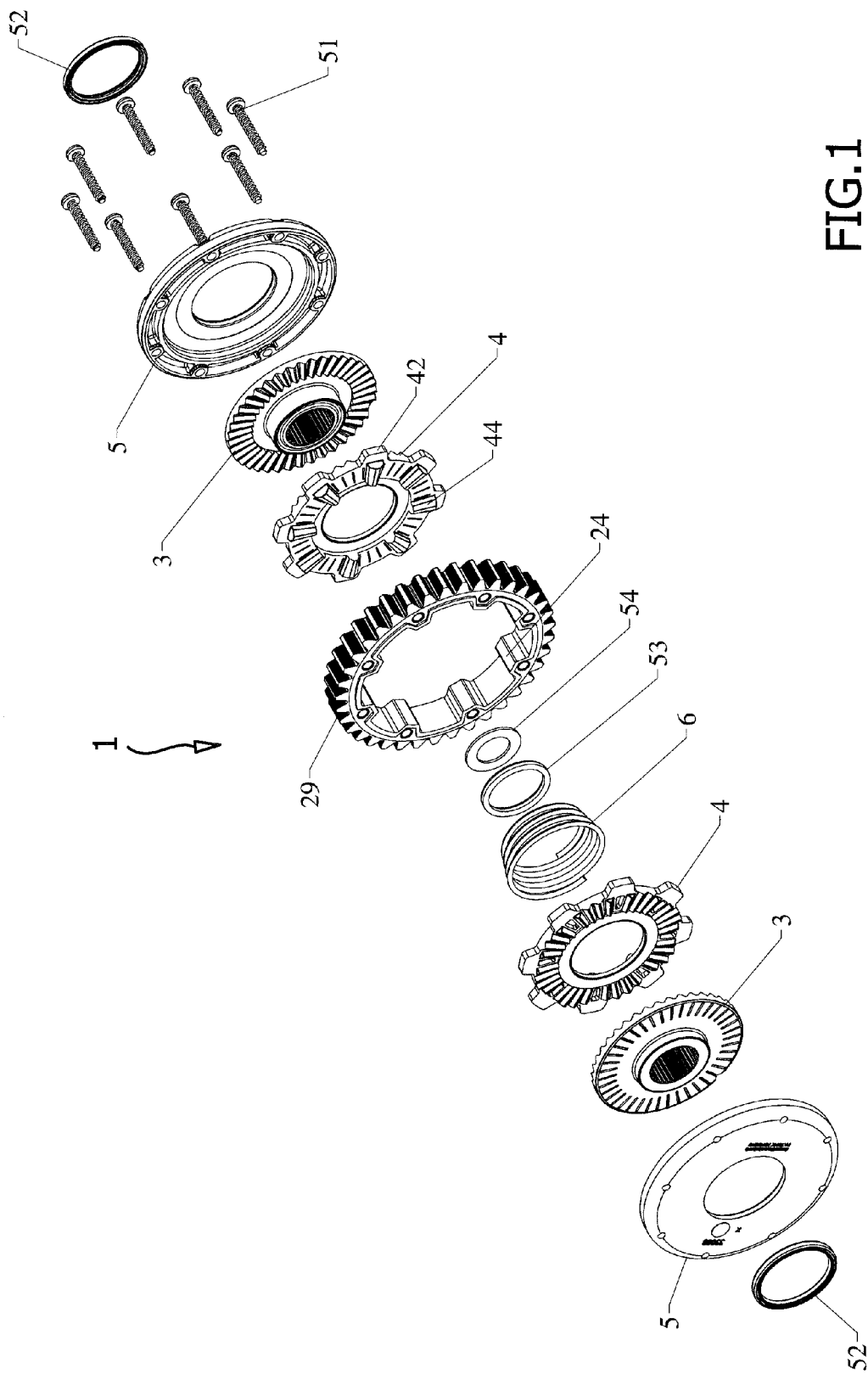
FIG. 1 is an exploded view of a preferred embodiment of the device according to the invention.

With reference to the figures and as indicated above, the invention relates to a differential device for a motorized wheeled vehicle 10.

In the example illustrated in the figures, said vehicle is the type in which the driver walks behind. Alternatively, said vehicle may be the type in which the driver rides along.

Said vehicle 10 is advantageously an automotive wheeled snowplow with the driver walking behind. The snowplow is provided with directional control means 11, such as side handles and/or a handlebar which allows the walking driver to apply a load torque to the vehicle to make it turn in one direction or the other, in order to make a left-hand or a right-hand turn.

As specified below, thanks to the differential device according to the invention with which the vehicle is fitted, the driver may in particular make said vehicle pivot about an axis perpendicular to the ground and situated between the side wheels of the vehicle, in order to make the vehicle turn on itself and make a very tight turn.

Said device comprises an input ring gear 2 capable of being rotated about its axis by the motor of said vehicle by means of a transmission system interposed between the ring gear 2 and said motor. To this end, the ring gear exhibits an external gear 29.

The device comprises two coaxial wheel 8 shafts 7 separate from one another and capable of turning freely in relation to one another when the vehicle makes a turn as detailed below. Each wheel shaft 7 carries a side wheel of the vehicle.

The device comprises two clutch mechanisms 3, 4 allocated on either side of the ring clutch 2 coaxially to said ring clutch 2. Each clutch mechanism comprises a first clutch element 3 mounted in a rotationally fixed manner with one of said wheel 8 shafts 7 and a second clutch element 4 mounted in a freely rotatable manner in relation to said shaft 7 and rotatable by the ring gear 2.

Said second clutch elements 4 are positioned between said first clutch elements 3. The device also comprises restoring means 6 of the clutch plates 4 towards the corresponding first clutch means 3. Said restoring means 6 are advantageously formed by a spring interposed between the clutch plates 4.

Following the description and with reference to the particular embodiment illustrated in the figures, the first clutch elements 3 are formed by hubs referred to as clutch hubs and the second clutch elements 4 are formed by clutch plates 4. Said first and second clutch elements 4 may of course be realized in other forms, such that the description given below applies to other designs of the first and second clutch elements 4.

The clutch hubs 3, clutch plates 4 and the input ring gear 2 are sandwiched between two flanges 5 and the wheel 8 shafts 7 pass through them. The two flanges 5 are fixed to one another by a screw assembly 51. Said device likewise comprises a set of sealing rings 52, gasket 53 and washer 54.

The ring gear 2, clutch hubs 3, clutch plates 4 and flanges 5 are parts which each exhibit an annular main body coaxial to the other parts.

Each of said clutch hubs 3 is mounted in a rotationally fixed manner with one of said wheel 8 shafts 7, preferably through slots with complementary shapes made on the corresponding wheel shaft 7 and on the inner circumference of the clutch hub 3.

For each clutch mechanism, the clutch plate 4 and the clutch hub 3 are provided with clutch means 43, 34 one with the other. Said clutch means may be friction or form-fit clutch means.

In the example illustrated in the figures, said clutch means are formed by teeth 43 made on a face of each plate 4 which exhibit inclined facing sides capable of forming cams or ramps with teeth 34 with complementary shapes made on the face of the hub 3 facing said plate 4. The sides of the teeth are preferably inclined at 45° in relation to the transverse plane to the axis of the hub or of the corresponding clutch plate.

Said clutch plate 4 is capable of being displaced axially between a position close to said clutch hub 3 in which it is engaged with the clutch hub 3 and a position spaced apart from said clutch hub 3 in which it is disengaged from the clutch hub 3. In said close-up position, the hub 3 and the plate 4 are placed one against the other, such that their teeth are meshed with one another. The hub 3 and the plate 4 then turn at the same speed. In said spaced position, their teeth are disengaged from one another, such that the hub 3 and the plate 4 are able to turn at different speeds.

As suggested above, said ring gear 2 and the clutch plates 4 are provided with co-rotational coupling means 24, 42. Said rotational coupling means allow the rotational load of the ring gear 2 to be transmitted to the clutch plates 4 when the plates 4 are driven by the ring gear 2. When the clutch plates 4 tend to turn more quickly than the input ring gear 2 or in the opposite direction, the ring gear 2 creates a brake in respect of the clutch plate 4, thanks to said coupling means 24, 42.

The clutch means 24, 42 between the ring gear 2 and the clutch plates 4 comprise internal teeth 24 made on the inner circumference of the ring gear 2 and external teeth 42 made on the outer circumference of each of the clutch plates 4. Each pair of internal teeth 24 of the ring gear 2 defines a housing space for a tooth 42 on each clutch plate 4. The width of each of the teeth 42 and the width of the housing defined between each pair of teeth 24, said widths being included in a direction parallel to the axis of the input ring gear, are adapted to allow pairs of teeth 24 to house teeth 42 of the two clutch plates 4, in particular when the two plates 4 are opposing one another.

Each clutch plate 4 is also provided with supporting contact means 44 with the other clutch plate 4. Said supporting contact means 44 allow plates to interact with one another, in order to change their axial position depending on the difference in the rotational speed of the wheel shafts.

Said supporting contact means 44 of each clutch plate 4 comprise teeth 44 oriented towards the other clutch plate 4. In the example illustrated in the figures, said teeth 44 of each plate 4 are formed from a single part with the teeth 42 of said plate 4 which form part of the coupling means between the ring gear 2 and said plate 4.

When the wheel shafts 7 turn at the same speed, the plates 4 are in a first angular configuration. In said first angular configuration of the plates 4, the teeth 44 of said plates 4 are opposite and are in supporting contact by their tips 441 with the teeth of the other plate 4, preventing axial displacement of the clutch plates 4 towards one another.

Said teeth 44 each comprise two inclined facing sides 440 forming ramps. The tip 441 of each tooth 44 is flat to allow stable support against the flat tip of the corresponding tooth 44 of the other plate 4 when the plates 4 are in said first angular position.

When the wheel shafts turn at different speeds relative to one another, an angular offset of the plates 4 in relation to one another results. The plates 4 are then in a second angular configuration different to the first configuration. In the second angular configuration, the teeth 44 of a plate 4 are offset angularly in relation to the teeth 44 of the other plate 4, thereby allowing an axial displacement of the plates 4 in relation to one another. The plate 4 can then be disengaged from the corresponding hub 3 if the speed of the corresponding wheel 8 of the vehicle 10 is different to that of the input ring gear 2.

In particular, in said second configuration of the plates 4 for which the teeth 44 of one of the plates 4 are offset angularly in relation to the teeth 44 of the other plate 4, the teeth 44 of the plates 4 face one another with one of their ramps 440. Said ramps 440 are capable of coming into supporting contact with one another while the plates 4 move from the second annular configuration to the first annular configuration, depending on the relative speed of the plates 4. The plates 4 can therefore be displaced axially such that they are spaced apart from one another by supporting one side 440 of a tooth 44 of a plate 4 on the corresponding side 440 of the tooth 44 of the other plate 4, combined with the restoring load of the restoring means 6, until the teeth 44 are opposite one another and in supporting contact through their tips 441.

Hence, when one of the two shafts 7 tends to turn at a speed greater than or opposing that of the ring gear 2 and different to that of the other shaft 7 and when the corresponding plate 4 is engaged with the ring gear 2, said plate 4 is offset angularly from the other plate 4 and pushed away axially by the play of the clutch means 43, 34 between the hub 3 and the plate 4 to be spaced apart from 3 to avoid said hub 3, such that the corresponding wheel 8 coupled with said hub by means of the corresponding shaft 7 is disengaged.

Each supporting ramp 440 is arranged such that the intersection between the middle plane passing through said supporting ramp 440 and the plane passing through the axis of the ring gear 2 and orthogonally to the radius of the plate 4 on which said supporting ramp 440 is situated, forms an inclined straight line with an angle other than 90° and preferably in the order of 45° in relation to the axis of the ring gear 2.

The internal teeth 24 of the ring gear are spaced in relation to one another along the inner periphery of the ring gear 2 at a sufficient distance to allow a pair of neighboring teeth 24 in the ring gear 2 to house the corresponding tooth 42 of the plate 4 and the corresponding tooth 42 of the other plate 4 when the plates 4 are offset angularly. In other words, the space between two neighboring teeth 24 in the ring gear 2 is at least equal to the distance over which the two teeth 42 of the plates 4 housed between said teeth 24 of the ring gear extend when the supporting teeth 44 of the plates 4 are in contact with one another through one of their sides.

The space between two neighboring teeth 24 of the ring gear 2 is also chosen such that, in the disengaged configuration of the clutch mechanisms 3, 4, the relative rotation of the two plates 4 relative to one another is limited, so that a tooth 44 of a plate 4 which is offset angularly in relation to a tooth 44 of the other plate 4 cannot be brought into opposition by axial supporting contact with a neighboring tooth of said other plate 44. In other words, each tooth 44 of a plate 4 is able to come into axial opposition through supporting contact with only one single tooth of said other plate 44.

According to a variant of the invention not illustrated in the figures, the clutch means between the clutch plates and the corresponding clutch hubs are formed by male and female friction cones.

The operation of a vehicle equipped with a differential device 1 according to the invention is detailed below with reference to the corresponding FIGS. 2 and 2A for a straight-line displacement of the vehicle and in FIGS. 3 to 4A corresponding to the making of a turn and the completion of said turn by rotating the vehicle 10 on itself.

Figure 2:
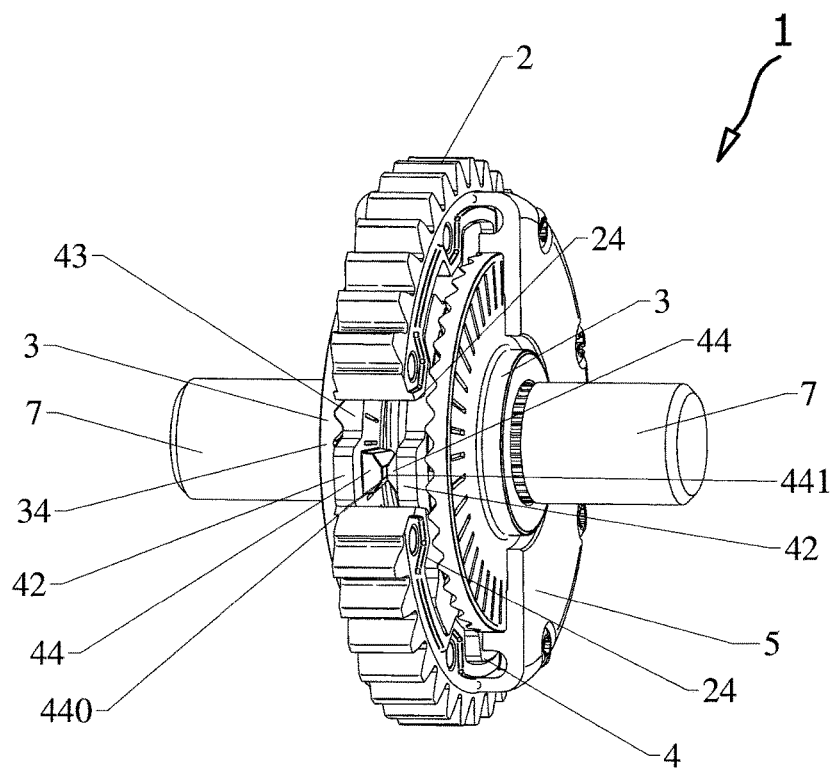
FIG. 2 is a perspective view of the assembled state of the device in FIG. 1, in a configuration in which the wheel shafts of the device are rotated by the input ring gear, an angular portion of the ring gear not being represented, so that the relative positioning of the movable clutch plates can be viewed.
Figure 2A:
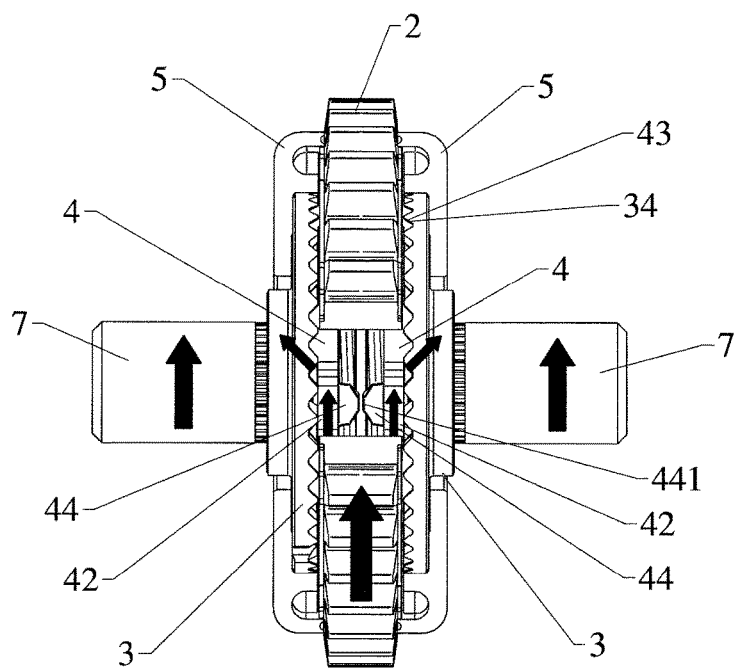
FIG. 2A is a front view of the device illustrated in FIG. 2.

FIG. 2 illustrates the device 1 according to the invention when the wheel 8 shafts 7 are driven by the ring gear 2 and turn at the same speed, which corresponds to a straight-line path of the automotive vehicle (walk in front or behind). The restoring means 6 restore the plates 4 to the clutch position with the hubs 3. The plates 4 are each kept placed against the respective hubs 3 by axial opposition of their teeth 44 at their flat tips 440.

As illustrated in FIG. 3, when the driver makes a turn by turning the handlebar, the outer side wheel turns more quickly than the inner side wheel, such that the plates 4 are offset angularly in relation to one another (see FIG. 3A).

The tips 441 of the teeth in supporting contact 44 with the plates 4 are no longer in opposition and said plates 4 are therefore able to translate axially towards one another, in order to allow the corresponding wheels 8 to be disengaged.

Figure 4:
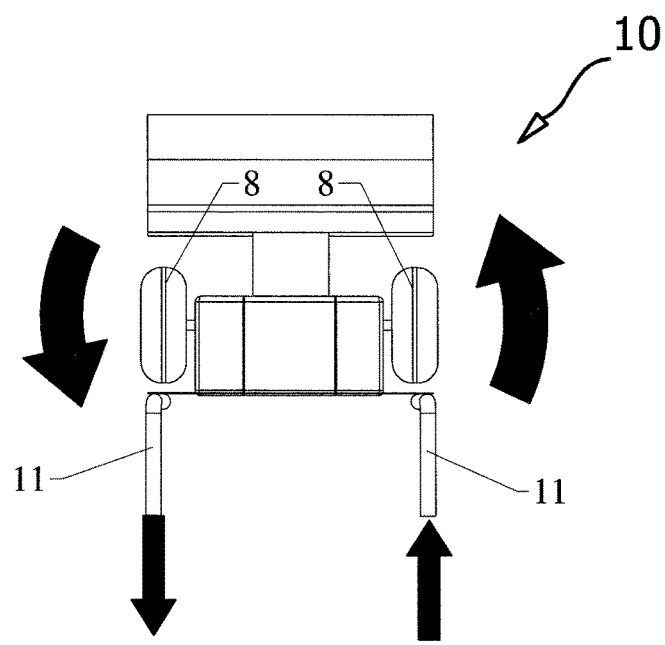
FIG. 4 is a schematic view from above of the snowplow in FIG. 3 completing the turn by rotating the snowplow on itself.
Figure 4A:
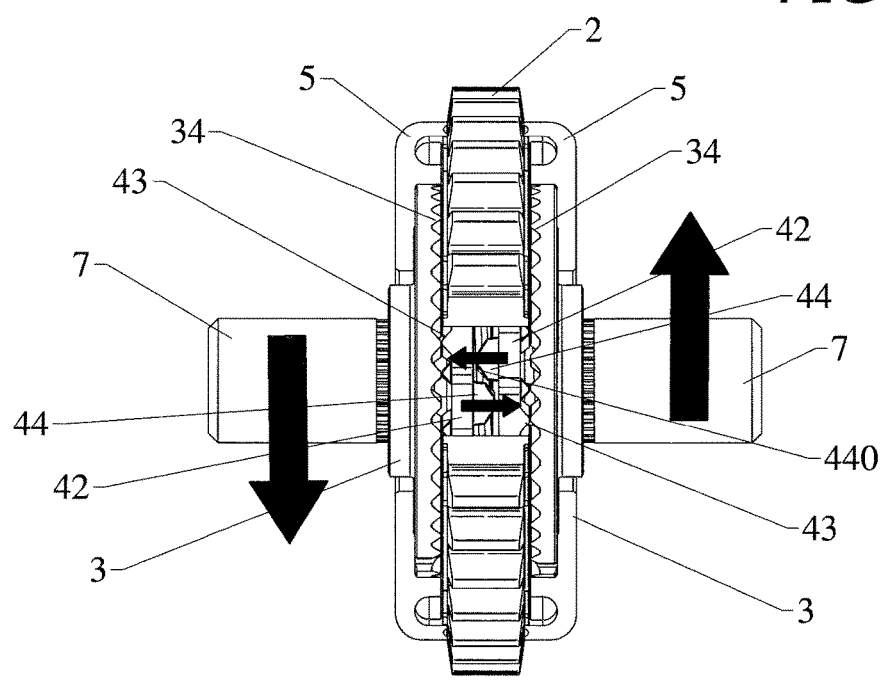
FIG. 4A is a front view of the device illustrated in FIG. 2 for a turning configuration such as that illustrated in FIG. 4.

During completion of the turn, as illustrated in FIGS. 4 and 4A, the driver pivots the vehicle on itself. The inner wheel then turns in an opposite direction to the ring gear 2. The corresponding plate 4 associated with the inner wheel comes into abutment through one of its teeth 42 against a tooth 24 of the ring gear. Moreover, the outer wheel still tends to turn more quickly than the ring gear 2. The corresponding plate 4 associated with the outer wheel then comes into abutment through one of its teeth 42 against the other tooth 24 of the pair of teeth 24 which houses said two teeth 42 of the plates 4. This results in a space and therefore a disengagement of each plate 4 in relation to its hub 3. The two wheels 8 are therefore able to turn freely in relation to one another in the direction and at the speed chosen by the driver.

The plates 4 are kept spaced apart from the hubs 3 and therefore disengaged while the axial restoring load of the restoring means 6, combined with the axial load of the teeth 44 of the plate 4 on the teeth 44 of the other plate 4, is insufficient to compensate for the opposing axial load exerted by the hubs 3 on the plates 4.

When, on coming out of the turn, the relative difference in speed between the wheels 8 drops to such a value that the axial load of the restoring means 6, combined with the axial load of the teeth 44 of the plate 4 on the teeth 44 of the other plate 4, allows the plates 4 to be returned towards the clutch hubs 3, said plates 4 return to their first relative angular position in which their teeth 44 are supported by their tips 441 in a spaced position of the plates 4 relative to one another.

The device according to the invention operates in the same manner when a turn is made in reverse and when a turn is made travelling forward. The clutch elements of the device are identical on either side of the input ring gear, such that the assembly of clutch elements of the device exhibits a plane of symmetry passing through the middle plane of the input ring gear.

The present invention is in no way restricted to the embodiments described and represented, but the person skilled in the art will be able to add any variant to this as he feels fit.

The invention claimed is:
1. A differential device for an automotive wheeled vehicle (10), said device (1) comprising:
an input ring gear (2) capable of being rotated by the motor of said vehicle,
two wheel (8) shafts (7) separate from one another and allocated to either side of the ring gear (2) coaxially to said ring gear (2),
two clutch mechanisms each comprising a first clutch element (3) mounted in a rotationally fixed manner with one of said wheel (8) shafts (7) and a second clutch element (4) mounted in a freely rotatable manner relative to said shaft (7) and capable of being rotated by the ring gear (2), said second clutch elements (4) being positioned between said first clutch elements (3),
for each clutch mechanism, said second clutch element (4) being capable of being displaced axially between a close position of said first clutch element (3) in which it is engaged with the first clutch element (3) and a spaced apart position of said first clutch element (3) in which it is disengaged from the first clutch element (3),
said ring gear (2) and the second clutch elements (4) being provided with co-rotational coupling means (24, 42),
wherein every second clutch element (4) is also provided with supporting contact means (44) with the other second clutch element (4), said supporting contact means (44) being capable, in a first given angular configuration of the second clutch elements (4) relative to one another, of keeping the second clutch elements (4) in the engaged position with the first corresponding clutch elements (3),
and said supporting contact means (44) also being capable, in a second given angular configuration of the second clutch elements (4) relative to one another, unlike in the first configuration, of allowing the second clutch elements (4) to shift into the disengaged position in relation to the first clutch elements (3).

2. The device as claimed in claim 1, wherein said second clutch elements (4) are configured to exhibit said first angular configuration when said shafts (7) turn at the same speed and, in said first angular configuration, said supporting contact means (44) of the second clutch elements (4) are axially opposed by supporting contact.

3. The device as claimed in claim 1, wherein said second clutch elements (4) are configured to exhibit said second angular configuration when said shafts (7) turn at different speeds in relation to one another and, in said second annular configuration, said supporting contact means (44) of one of the second clutch elements (4) are offset angularly in relation to the supporting contact means (44) of the other second clutch element (4).

4. The device as claimed in claim 1, wherein, said device (1) comprises restoring means (6) of the second clutch elements (4) towards the first corresponding clutch elements (3).

5. The device as claimed in claim 1, wherein said supporting contact means (44) of every second clutch element (4) comprise teeth (44) oriented towards the other second clutch element (4) which, in said first angular configuration, are in supporting contact with the teeth of the other second clutch element (4) by their tips (441), preventing an axial displacement of the second clutch elements (4) towards one another and which, in the second angular configuration, are offset angularly in relation to the other teeth, allowing an axial displacement of the second clutch elements (4) towards one another.

6. The device as claimed in claim 5, wherein each of said teeth (44) comprises two inclined facing sides (440) forming ramps which converge in the direction of the flat tip (441) of the tooth.

7. The device as claimed in claim 1, wherein the coupling means (24, 42) between the ring gear (2) and the second clutch elements (4) comprise so-called internal teeth (24) made on the inner circumference of the ring gear (2) and so-called external teeth (42) made on the outer circumference of each of the second clutch elements (4) housed between the internal teeth (24) of the ring gear (2).

8. The device as claimed in claim 7, wherein the teeth (24) of each pair of internal teeth of the ring gear (2) are spaced at a distance allowing an external tooth (42) of one of the second clutch elements (4) and an external tooth (42) of the other second clutch element (4) to be housed.

9. The device as claimed in claim 1, wherein the first clutch elements (3), the second clutch elements (4) and the input ring gear (2) are sandwiched between two flanges (5) fixed one to the other and the wheel (8) shafts (7) pass through them.

10. An automotive wheeled vehicle (10) comprising a differential device (1) as claimed in claim 1 and two side wheels, one being fixed to one of said wheel shafts (7) and the other to the other wheel shaft (7), said wheeled vehicle also comprising a motor and torque transfer means interposed between said motor and the input ring gear (2).

11. The device as claimed in claim 2, wherein said second clutch elements (4) are configured to exhibit said second angular configuration when said shafts (7) turn at different speeds in relation to one another and, in said second annular configuration, said supporting contact means (44) of one of the second clutch elements (4) are offset angularly in relation to the supporting contact means (44) of the other second clutch element (4).

12. The device as claimed in claim 2, said device (1) comprises restoring means (6) of the second clutch elements (4) towards the first corresponding clutch elements (3).

13. The device as claimed in claim 2 said supporting contact means (44) of every second clutch element (4) comprise teeth (44) oriented towards the other second clutch element (4) which, in said first angular configuration, are in supporting contact with the teeth of the other second clutch element (4) by their tips (441), preventing an axial displacement of the second clutch elements (4) towards one another and which, in the second angular configuration, are offset angularly in relation to the other teeth, allowing an axial displacement of the second clutch elements (4) towards one another.

14. The device as claimed in claim 13, wherein each of said teeth (44) comprises two inclined facing sides (440) forming ramps which converge in the direction of the flat tip (441) of the tooth.

15. The device as claimed in claim 2, wherein the coupling means (24, 42) between the ring gear (2) and the second clutch elements (4) comprise so-called internal teeth (24) made on the inner circumference of the ring gear (2) and so-called external teeth (42) made on the outer circumference of each of the second clutch elements (4) housed between the internal teeth (24) of the ring gear (2).

16. The device as claimed in claim 15, wherein the teeth (24) of each pair of internal teeth of the ring gear (2) are spaced at a distance allowing an external tooth (42) of one of the second clutch elements (4) and an external tooth (42) of the other second clutch element (4) to be housed.

* * * * *